(12) United States Patent
Takashima

(10) Patent No.: US 8,237,608 B2
(45) Date of Patent: Aug. 7, 2012

(54) MAGNETRON AND RADAR APPARATUS

(75) Inventor: Tetsuya Takashima, Nishinomiya (JP)

(73) Assignee: Furuno Electric Company Limited, Nishinomiya (JP)

( * ) Notice: Subject to any disclaimer, the term of this patent is extended or adjusted under 35 U.S.C. 154(b) by 243 days.

(21) Appl. No.: 12/510,364

(22) Filed: Jul. 28, 2009

(65) Prior Publication Data

US 2010/0066593 A1 Mar. 18, 2010

(30) Foreign Application Priority Data

Sep. 17, 2008 (JP) ................................. 2008-237277

(51) Int. Cl.
| | |
|---|---|
| *H01J 25/50* | (2006.01) |
| *G01S 13/02* | (2006.01) |
| *G01S 7/02* | (2006.01) |
| *H01J 25/00* | (2006.01) |
| *G01S 13/00* | (2006.01) |
| *G01S 7/00* | (2006.01) |

(52) U.S. Cl. ............. 342/175; 342/82; 342/89; 331/1 R; 331/5; 332/117; 332/129; 332/131; 332/132; 315/32; 315/39.51

(58) Field of Classification Search .................... 342/27, 342/82, 89, 175; 331/1 R, 5; 332/117, 129, 332/131, 132; 315/39.51–39.77, 32; 335/209, 296, 302, 306

See application file for complete search history.

(56) References Cited

U.S. PATENT DOCUMENTS

| | | | | | |
|---|---|---|---|---|---|
| 3,582,707 | A | * | 6/1971 | Hynes ........................ | 315/39.77 |
| 3,590,312 | A | * | 6/1971 | Blank et al. ................ | 315/39.61 |
| 3,706,910 | A | * | 12/1972 | Foreman .................... | 315/39.51 |
| 3,731,137 | A | * | 5/1973 | Foreman .................... | 315/39.77 |
| 4,194,142 | A | * | 3/1980 | Gerard ....................... | 315/39.77 |
| 5,519,373 | A | * | 5/1996 | Miyata ....................... | 335/306 |
| 6,960,283 | B2 | * | 11/2005 | Lee et al. ................... | 315/39.51 |

FOREIGN PATENT DOCUMENTS

| | | | | | |
|---|---|---|---|---|---|
| JP | 60-79643 | A | * | 5/1985 | ............... 315/39.51 |
| JP | 62-226539 | A | * | 10/1987 | |
| JP | 2000-299070 | A | | 10/2000 | |

* cited by examiner

*Primary Examiner* — Bernarr Gregory
(74) *Attorney, Agent, or Firm* — Birch, Stewart, Kolasch & Birch, LLP

(57) ABSTRACT

This disclosure is related to a magnetron including a cylindrical cathode having a center axis, an anode coaxially arranged with the cathode so as to be separated from the cathode via a predetermined space, and a pair of pole pieces provided to both ends of the cathode in the axial direction so as to oppose to each other and having opposing faces perpendicular to the axial direction. The pole piece has a first ridge of a ring shape that is formed on the opposing face and is coaxial with the cathode.

18 Claims, 16 Drawing Sheets

MAGNETRON AND RADAR APPARATUS

CROSS-REFERENCE TO RELATED APPLICATIONS(S)

This application claims priority under 35 U.S.C. §119 to Japanese Patent Application No. 2008-237277, which was filed on Sep. 17, 2008, the entire disclosure of which is hereby incorporated by reference.

TECHNICAL FIELD

The present invention relates to a radar apparatus and a structure of a magnetron used thereto.

BACKGROUND

JP2000-299070(A) discloses a structure of a magnetron capable of suppressing a spurious level low. In this disclosure, as shown in FIG. 2, a configuration of a pair of the pole pieces 5 which gives a magnetic field to an acting space 3 between a cathode 2 and the anode vanes 4 is shown in FIG. 1 of the disclosure. The opposing faces of the pole pieces 5 have a truncated cone shape having a taper of 20 degrees or greater. Because the opposing faces of the pole pieces 5 are formed in the truncated cone shape, the magnetic flux density in the acting space typically becomes higher at the both ends than the central position in the axial direction (refer to a magnetic flux density distribution of FIG. 3 of this disclosure).

Because the magnetic flux density of the acting space is higher toward the both ends in the axial direction, a spurious level of an electric wave transmitted from the magnetron is suppressed low. Generally, since an electric field is disturbed in the boundary planes at the both ends of the cathode 2 and the anode vane 4 in the axial direction, the magnetic field may act to reduce the electronic distribution near the boundary planes.

Therefore, adopting the shape disclosed in JP2000-299070 (A), the magnetic field near the boundary is strengthened to bounce electrons toward the weaker side of the magnetic field. This is a phenomenon in which an area called the "mirror" where lines of magnetic force are converged in a funnel shape receives repulsion and, thus it is referred to as "the mirror effect." With this effect, the distribution of electrons is brought toward the central part of the cathode 2 in the axial direction to increase a rate of electrons uniformly moving. As a result, unnecessary radiation (spurious emission) is reduced.

However, with the configuration of JP2000-299070(A), as shown in FIG. 3 of this disclosure, the magnetic flux density in the acting space would be a distribution such that it entirely inclines linearly in the radial direction. Therefore, the suppression of the spurious emission is limited due to such non-uniformity of the magnetic flux density distribution over the entire acting space area in the radial direction. Particularly, magnetrons for radar are typically used to generate pulsed microwaves at a predetermined repetition frequency. For this reason, it may be necessary to consider the suppression of the spurious emission generated especially during the rising period of a pulse period during which the microwaves occur. Apparently, JP2000-299070(A) does not consider this point at all.

Recently, while microwave-applied instruments and the applications thereof have increased, the spurious regulations are becoming strict more and more. Meanwhile, with a configuration in which a filter intervenes, the suppression of the spurious emission which differs only somewhat in frequency comparing with the fundamental wave is limited. In addition, because the configuration does not conform to the recent demands for size reduction of the instruments, the suppression of the spurious emission is now demanded simply for modifications of the magnetron per se.

SUMMARY

The present invention addresses the above-described conditions and provides a magnetron that suppresses spurious emission on a high-frequency side during a pulse rising edge, and a radar apparatus using the magnetron.

According to an aspect of the invention, a magnetron includes a cylindrical cathode having a center axis, an anode coaxially arranged with the cathode so as to be separated from the cathode via a predetermined space, and a pair of pole pieces provided to both ends of the cathode in the axial direction so as to oppose to each other and having opposing faces perpendicular to the axial direction. The pole piece has a first ridge of a ring shape that is formed on the opposing face and is coaxial with the cathode.

The first ridge may have a diameter that is approximately equal to a diameter of the cathode.

The anode may be provided with a plurality of anode vanes having a shape protruding from the inner wall of the anode toward the cathode.

The pole piece may further include a second ridge of a ring shape formed on the corresponding opposing face so as to coaxial with the cathode and having a diameter larger than the diameter of the first ridge.

The diameter of the second ridge may be larger than an inner diameter formed by inner ends of the anode vanes and smaller than the diameter of the inner wall of the anode.

The first ridge and the second ridge may be made of a magnetic material.

A magnetic flux density of the space in the radial direction, that is perpendicular to the axis, may decrease substantially continuously from the axis toward the outside up to a predetermined range.

The magnetic flux density may be distributed uniformly in a range outside the predetermined range in the radial direction.

The magnetic flux density of the space in the radial direction, that is perpendicular to the axis, decreases substantially in inverse proportion to the square of a distance from the axis up to a predetermined inner range located inside the predetermined range toward the outside from the axis, and decreases in substantially inverse proportion to the distance from the axis up to the predetermined range from the predetermined inner range toward the outside from the axis.

According to another aspect of the invention, a magnetron includes a cylindrical cathode having a center axis, an anode coaxially arranged with the cathode so as to be separated from the cathode via a predetermined space, and a pair of pole pieces provided to both ends of the cathode in the axial direction so as to oppose to each other and having opposing faces perpendicular to the axial direction. The pole piece includes a cylindrical body having a magnetic permeability higher than a magnetic permeability of the pole piece, and formed in the pole piece coaxially with the cathode.

A magnetic flux density of the space in the radial direction, that is perpendicular to the axis, may decrease substantially continuously from the axis toward the outside up to a predetermined range.

The magnetic flux density may be distributed uniformly in a range outside the predetermined range in the radial direction.

According to still another aspect of the invention, a magnetron includes a cylindrical cathode having a center axis, an anode coaxially arranged with the cathode so as to be separated from the cathode via a predetermined space, a pair of pole pieces provided to both ends of the cathode in the axial direction so as to oppose to each other and having opposing faces perpendicular to the axial direction, and a magnetic flux density control module for decreasing a magnetic flux density of the space in the radial direction, that is perpendicular to the axis, substantially continuously from the axis toward the outside up to a predetermined range.

The magnetic flux density control module may be a magnetic excitation module arranged outside the both ends of the cathode in the axial direction, for generating a magnetic field where magnetic fluxes are parallel to the axial direction.

The magnetic excitation module may include a magnet having a cylindrical space having an axis that is substantially in agreement with the axis, and an electromagnetic coil arranged in the cylindrical space.

The magnetic flux density of the space in the radial direction, that is perpendicular to the axis, may decrease substantially continuously from the axis toward the outside up to a predetermined range.

The magnetic flux density may be distributed uniformly in a range outside the predetermined range in the radial direction.

According to another aspect of the invention, a radar apparatus includes any one of the magnetrons described above, and a reception module for receiving an electromagnetic wave that is discharged from the magnetron and reflected on a target object.

BRIEF DESCRIPTION OF THE DRAWINGS

The present disclosure is illustrated by way of example and not by way of limitation in the figures of the accompanying drawings, in which the like reference numerals indicate like elements and in which:

FIG. 7A is a corrected characteristic corresponding to Equation 15 in the case of "uniform electric field" and FIG. 7B is a corrected characteristic corresponding to Equation 14 in the case of being "in vacuum;"

FIG. 8A shows a magnetic flux density after the correction and FIG. 8B shows each characteristic of the draft angular velocity after the correction;

DETAILED DESCRIPTION

Figure 1:
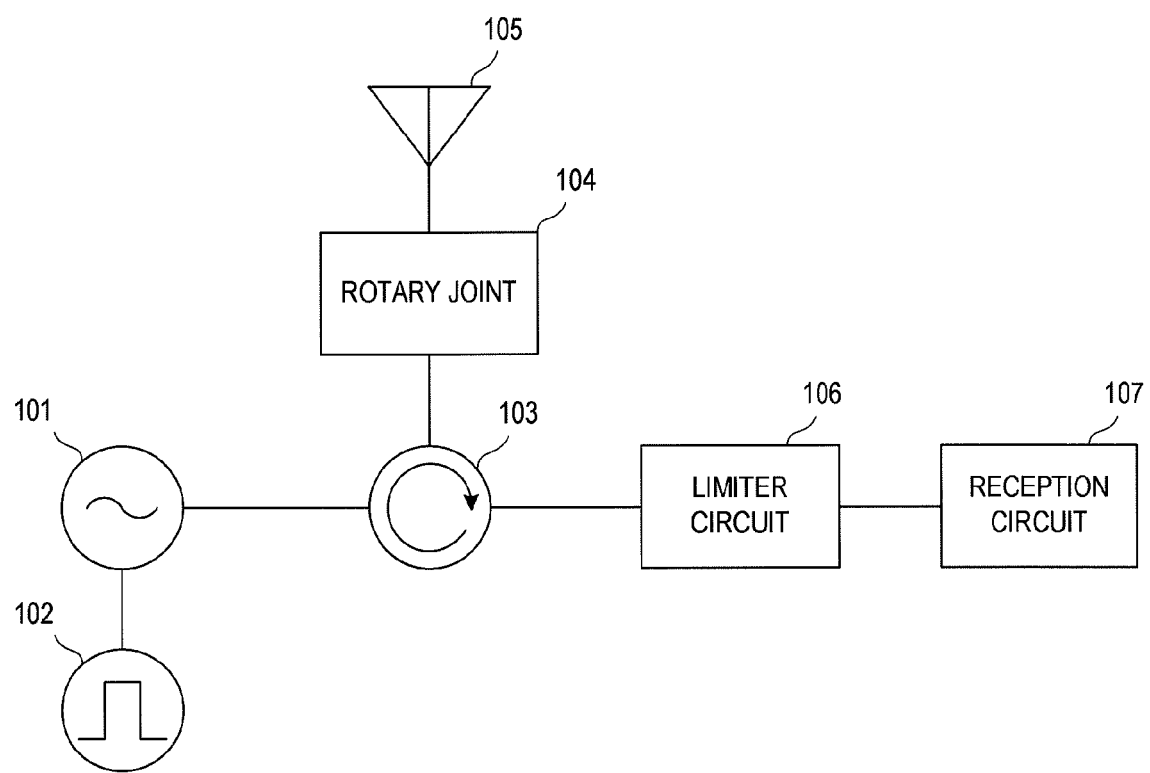
FIG. 1 is a block diagram of a microwave transceiver of a radar apparatus, as an example, to which a magnetron according to the present invention is applied.

FIG. 1 is a block diagram of a radar apparatus, as an example to which a magnetron according to an embodiment of the present invention is applied. The radar apparatus includes a magnetron 101 that transmits a microwave having a fundamental wave at 9.4 GHz, for example. A pulse drive circuit 102 outputs to the magnetron 101 a trigger pulse having a pulse width of approximately 75 ns at a predetermined repetition frequency (for example, 2000 pps) to drive the magnetron 101 for a duration period of the trigger pulse and thereby causing the magnetron 101 to generate a pulse-shaped microwave intermittently.

A circulator 103 serves as a switch for selectively propagating the microwave pulse generated by the magnetron 101 toward an antenna 105 or propagating a received signal from the antenna to a reception circuit 107. A rotary joint 104 electrically connects stationary components and rotary components of this apparatus. The antenna 105 has a narrow directivity and is rotated at a constant speed by a motor (not illustrated). The antenna 105 transmits a microwave pulse to substantially all direction (360 degree) as a detection signal. A limiter circuit 106 suppresses a high electric power signal level at immediately after start of the reception to protect the reception circuit 107. The reception circuit 107 receives a signal that is reflected on a target object and comes back to the antenna 105. The signal received from the target object is detected by the reception circuit 107, and then, may be displayed on a monitor (not illustrated) so as to be manually distinguished in distance and direction.

Figure 2:
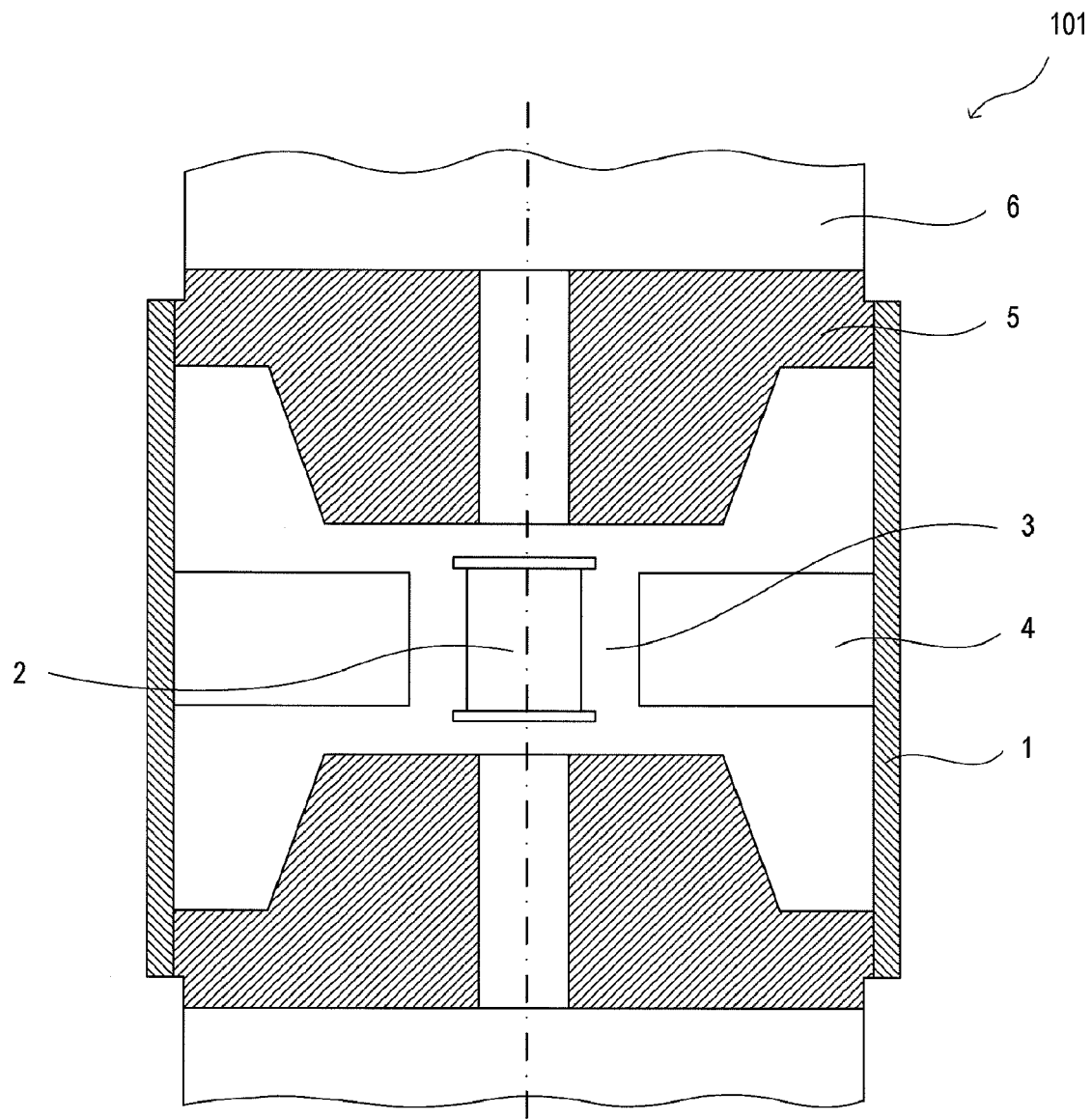
FIG. 2 is a longitudinal cross-sectional view illustrating a common structure of the magnetron.

FIG. 2 is a longitudinal cross-sectional view illustrating a common structure of the magnetron 101. In FIG. 2, an anode cylinder 1 has a cylindrical shape, and a cathode 2 of a cylindrical shape having a predetermined smaller radius is coaxially arranged at the center of the axis. A plurality of anode vanes 4 are radially arranged on an inner wall of the anode cylinder 1 so as to be equally spaced in the circumferential direction. An annular acting space 3 is formed between an inner circumferential end face of the anode vanes 4 (i.e., the contour face formed by the inner tip ends of the anode vanes 4) and an outer circumferential surface of the cathode 2. Note that a gap formed between the adjacent anode vanes 4 functions as a resonant cavity (also simply referred to as "cavity" throughout the specification).

In order to drive the magnetron 101, voltage is applied from a power supply (not illustrated) so that the anode vanes 4 have a predetermined electrical potential Va. Thereby, a predetermined electric field E is formed in the acting space 3 between the cathode 2 and the anode vanes 4.

A pair of the pole pieces 5 made of a magnetic material are arranged on the both sides of the acting space 3 in the axial direction so as to intervene the acting space 3 therebetween. Opposing faces of the pole pieces 5 are formed in a flat plane surface perpendicular to the axial direction and parallel to each other. Magnets 6 are arranged on the outside of the pole pieces 5 in the axial direction. The magnetic fluxes caused by the magnets 6 form a magnetic field, which extends in the axial direction, in the acting space 3 between the cathode 2 and the anode vanes 4 via the both pole pieces 5.

Figure 3:
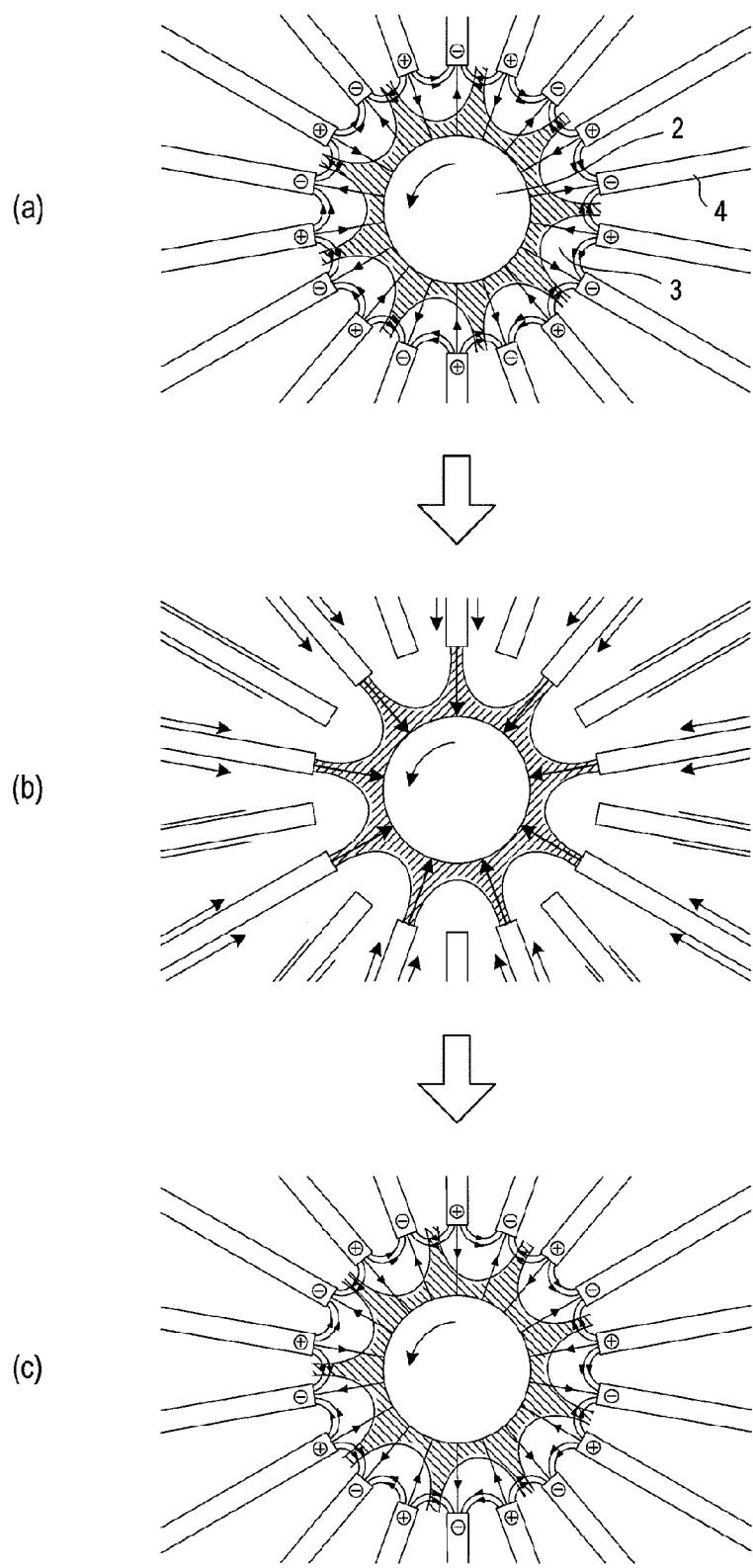
FIG. 3 is a view showing relations between an electron cloud (space-charge spokes) and an electric field circling around a cavity.

A particular structure of the magnetron of this embodiment is shown in FIG. 3. As may be described above, the magnetron of this embodiment includes a cylindrical cathode, and a cylindrical anode coaxially arranged with the cathode so as to be separated from the cathode via a predetermined space, and a pair of pole pieces arranged so as to oppose the both ends of the cathode in the axial direction intervening a gap therebetween, and having opposing faces perpendicular to the axial direction.

In order to form the magnetic flux distribution as described above, the magnetron of this embodiment may have a magnetic flux density control module for reducing substantially continuously the magnetic flux density of the space in the radial direction, which is perpendicular to the axis, up to a predetermined range toward the outside from the axis. The magnetic flux density control module may include a first ridge of a ring shape coaxial with the cathode formed on the opposing face of the pole piece. A diameter of the first ridge may be approximately equal to a diameter of the cathode.

The anode may include a plurality of anode vanes having a shape protruding toward the cathode from the inner wall thereof. Each of the pair of pole pieces may have a second ridge of a ring shape having a larger diameter than the diameter of the first ridge and arranged on the opposing face so as to coaxial with the cathode.

With the configuration of this embodiment described above, the magnetic flux density of the space in the radial direction, which is perpendicular to the axis, decreases substantially continuously in the predetermined range toward the outside, and the magnetic flux density is distributed substantially uniformly outside the predetermined range. By appropriately changing the shape of the components concerned, the magnetic flux density of the space in the radial direction, which is perpendicular to the axis, may be reduced substantially in inverse proportion to the square of a distance from the axis up to a predetermined inner range located inside the predetermined range toward the outside from the axis, and may be reduced substantially in inverse proportion to the distance from the axis in a range outside the predetermined inner range.

The radar apparatus of this embodiment uses the magnetron described above as a pulse transmitter, and includes a receiver for receiving an echo signal from the target object.

According to this embodiment, an electric field is given to the acting space between the cathode and the anode by the voltage applied to the anode. In addition, a magnetic field parallel to the axial direction is given to the acting space through the pole pieces. In the acting space, a space where the electric field and the magnetic field intersect perpendicularly to each other is formed.

A group of electrons (electron cloud) jumped out from the cathode circles in the acting space, and synchronizes with circling of the electric field so that electrical potential energy of the electrons resonates in the cavity on the side of the anode. By this resonation, the group of the electrons (electron cloud) jumped out from the cathode is converted into an electromagnetic wave (microwave) of the fundamental frequency.

The magnetic flux density control module forms a slope in the magnetic flux density within the acting space in the radial direction, reducing substantially continuously from the center side up to the predetermined range. As a result, spurious emission on a high-frequency side that is resulted from a relatively high velocity circling (drift angular velocity) of the electrons around the cathode are suppressed when applied with an electric field (during a rising period). In the subsequent drive period, a microwave at an original frequency is generated by the electron cloud in a balanced state. As a result, the spurious emission on the high-frequency side is suppressed as a whole.

In the above configuration, the magnetic flux density is uniformly distributed outside the predetermined range of the acting space in the radial direction. In other words, the magnetic flux density on the side of the cathode is given with the inclination, and the magnetic flux density outside the range is given with a common uniformity in distribution. Thus, it is possible to achieve a spurious suppression control according to the behavior of the electron cloud on the side of the cathode during the pulse rising period.

Alternatively, as another configuration, the magnetic flux density may be reduced in inverse proportion to the square of a distance from the axial center for a range from the center side to a first range, and further, the magnetic flux density may be reduced in inverse proportion to a distance from the axial center from the first range to a predetermined range. According to this configuration, because the magnetic flux density is distributed with a slope so that it decreases in inverse proportion to the square of the distance from the axial center for the range from the center side of the acting space to the first range in the outward radial direction, the spurious emission on the high-frequency side during the rising period can be suppressed. Further, because the magnetic flux density is distributed with a slope so that it decreases in inverse proportion to the distance from the axial center for the range from the first range to the predetermined range, the spurious emission on the high-frequency side during the rising period including the rising edge can be suppressed.

Hereinafter, the principle of being capable of suppressing the spurious emission on the high-frequency side by controlling the distributions of the magnetic flux density will be explained in more detail.

First, behaviors of the electron cloud that are the electrons and its group jumped out from the cathode 2 in a common structure is explained using FIGS. 3, 4A-4D, 5A and 5B, 6A and 6B, 7A and 7B, and 8A and 8B.

FIG. 3 is views showing relations between the electron cloud (space-charge spoke) and the electric field circling around the cavity. In the acting space 3 between the cathode 2 and the anode vane 4, the electron cloud circles around the cathode 2 in the direction of an arrow in the figures by an E×B drift (E: electric field, B: magnetic field). The electrical potential energy of each electron of the electron cloud acts with the electric field in the cavity and is converted into an electromagnetic field. At this time, resonance takes place in a state in which the circling speed of the electron cloud and the circling speed of the electric field around the cavity are equal to oscillate the magnetron 101. Hereinafter, the drift angular velocity of the electrons will be verified for each state of the acting space.

[A] In Balanced State

First, assuming that the acting space 3 is in the balanced state in which the number of the electrons jumped out from the cathode 2 is equal to the number of the electrons absorbed by the cathode 2, the electrons perform a cycloidal motion in a plane intersecting perpendicularly to a uniform magnetic field B, and circle (drift) around the cathode 2. The drift speed $V_D$ of the electrons at this point can be expressed as following.

$$v_D = \frac{E \times B}{|B|^2} \quad (1)$$

Here, it is assumed that an electric field in π mode is excited in the cavity. If the frequency thereof is "f" and a mode number is "N" (½ number of the cavities in the π mode), a speed at which the electric field excited in the cavity will rotate along a circle of radius "r" can be expressed as following.

$$v_E = \frac{2\pi r}{N} \cdot f \quad (2)$$

Here, a radius from the axial center is "r," a dimension (radius) from the axial center to the inner circumferential end face of the anode vanes 4 is "$r_a$," and a radius of the cathode 2 is "$r_c$." If a voltage Va is applied to the anode vanes 4, a distribution φ of the electrical potential can be expressed as following because the acting space is considered be in the balanced state.

$$\phi = \frac{r^2 - r_c^2}{r_a^2 - r_c^2} V_a \quad (3)$$

Here, because an intensity E of the electric field is E=∂φ/∂r, Equation 3 can be as following.

$$E = 2 \cdot V_a \cdot \frac{r}{r_a^2 - r_c^2} \quad (4)$$

An oscillation condition of the magnetron 101 is such that the circling speed $V_E$ of the electric field around the cavity and the circling speed $V_D$ of the electron cloud are in agreement with each other as described above. If $V_E = V_D$, the electron cloud will continuously receive at the same spot a force of the electric field being excited (see (a), (b) and (c) of FIG. 3) and, thus, an oscillation will take place. Next, from Equations 1, 2, and 4, the voltage Va can be expressed as following.

$$V_a = \frac{\pi(r_a^2 - r_c^2)}{N} \cdot f \cdot B \quad (5)$$

Further, from $\omega_D = (1/r) \cdot E/B$ and Equation 4, a drift angular velocity $\omega_D$, which is obtained from $V_D = E/B$ and $V_D = r\omega_D$ ($\omega_D$: drift angular velocity), can be expressed as following.

$$\omega_D = \frac{1}{r} \cdot \frac{2V_a r}{B(r_a^2 - r_c^2)} \quad (6)$$

As seen from Equation 6, the distance r is canceled out in this equation. For this reason, the drift angular velocity $\omega_D$ is not dependent on the distance r, and is constant within the acting space 3. As described above, the electron cloud starts rotating slowly at the rising edge of the voltage Va of the anode vanes 4. When the voltage Va is in a steady state, the rotation will be expected to be at a desired circling speed.

[B] In Vacuum

Next, the rising of the magnetron 101 is explained. Because there is little number of electrons jumped out from the cathode 2 at the rising edge of the magnetron 101, the acting space 3 can be treated as being in vacuum. A potential distribution V(r) between the coaxial conductors in this state can be expressed as following.

$$V(r) = V_a \frac{\ln \frac{r_a}{r}}{\ln \frac{r_a}{r_c}} \quad (7)$$

Assuming that $\sigma = r_c/r_a$, because the electric field E is ∂V(r)/∂r, Equation 7 can be as following.

$$E = \frac{V_a}{\ln \frac{r_a}{r_c}} \cdot \frac{d}{dr}\left(\ln \frac{r_c}{r}\right) = \frac{V_a}{\ln\left(\frac{1}{\sigma}\right)} \cdot \frac{1}{r} \quad (8)$$

Therefore, the drift angular velocity $\omega_D$ can be found as following from Equation 8 and $\omega_D = (1/r) \cdot E/B$ described above.

$$\omega_D = \frac{V_a}{B \cdot \ln\left(\frac{1}{\sigma}\right)} \cdot \frac{1}{r^2} \quad (9)$$

According to Equation 9, the drift angular velocity $\omega_D$ is in inverse proportion to the square of the distance r. Therefore, the electrons rotate at a higher angular velocity as they are located in an area closer to the cathode 2 in the acting space 3.

Figure 4A:
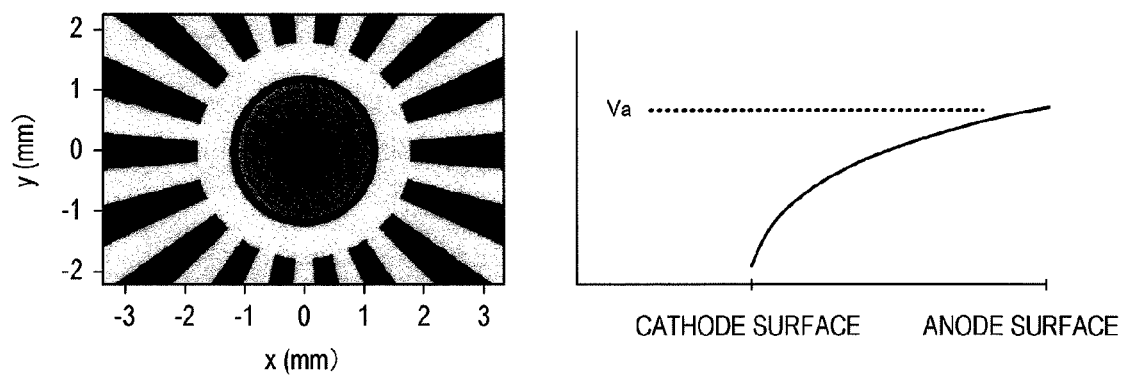
FIGS. 4A to 4D are views showing several states of the electron cloud (left-hand side figures) and corresponding electrical potential distributions (right-hand side figures), in the order of a formation process of the electron cloud.
Figure 4B:
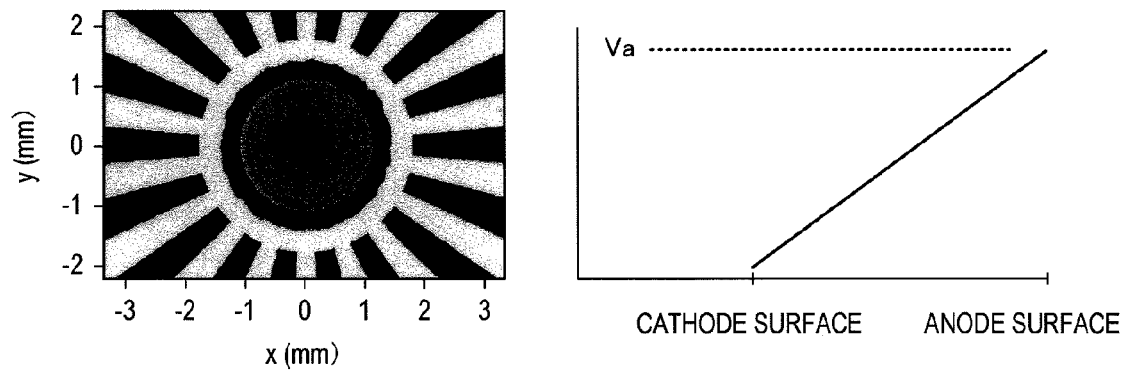
Figure 4C:
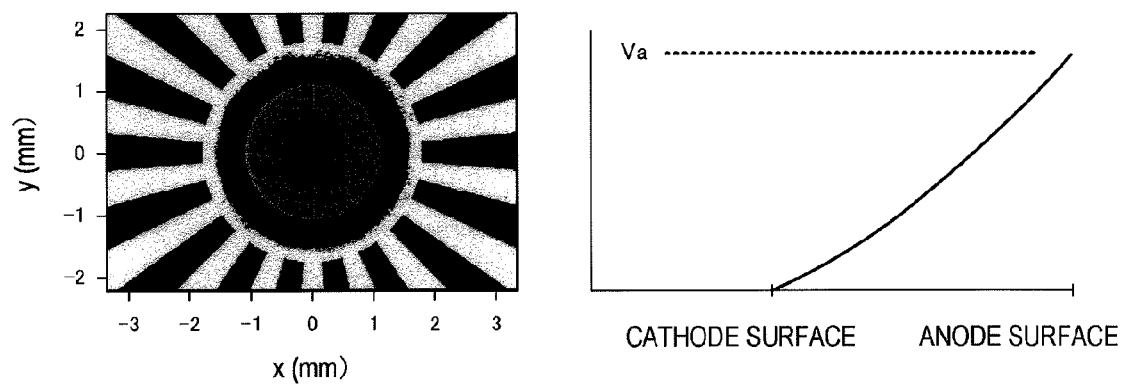
Figure 4D:
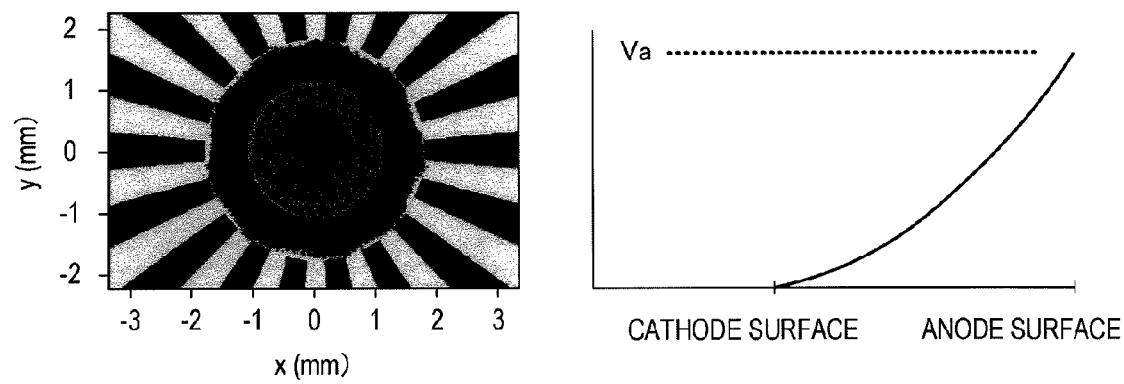

FIGS. 4A to 4D are views showing several states of the electron cloud (left-hand side figures), and corresponding electrical potential distributions (right-hand side figures), in the order of a formation process of the electron cloud. More specifically, FIG. 4A shows a state in vacuum, FIG. 4B shows a state in which an electron cloud is formed in the vicinity of the cathode 2 within the acting space 3, FIG. 4C shows a state in which an electron cloud is formed to fill substantially a half of the acting space 3 on the center side, and FIG. 4D shows a balanced state. The electrical potential distribution of FIG. 4A is the state of being "in vacuum" shown by Equation 7 and the electrical potential distribution of FIG. 4D is the "balanced state" shown by Equation 3.

Figure 5A:
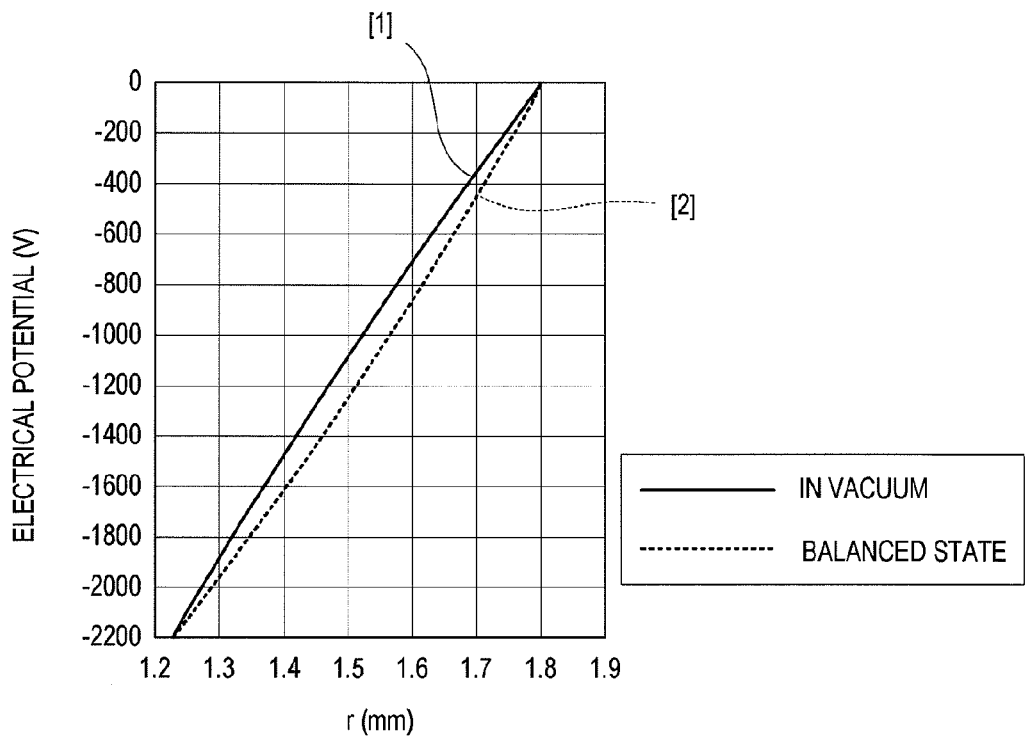
FIG. 5A is a graph showing the electrical potential distributions in an acting space in the case of being "in vacuum" and in the case of "balanced state.
Figure 5B:
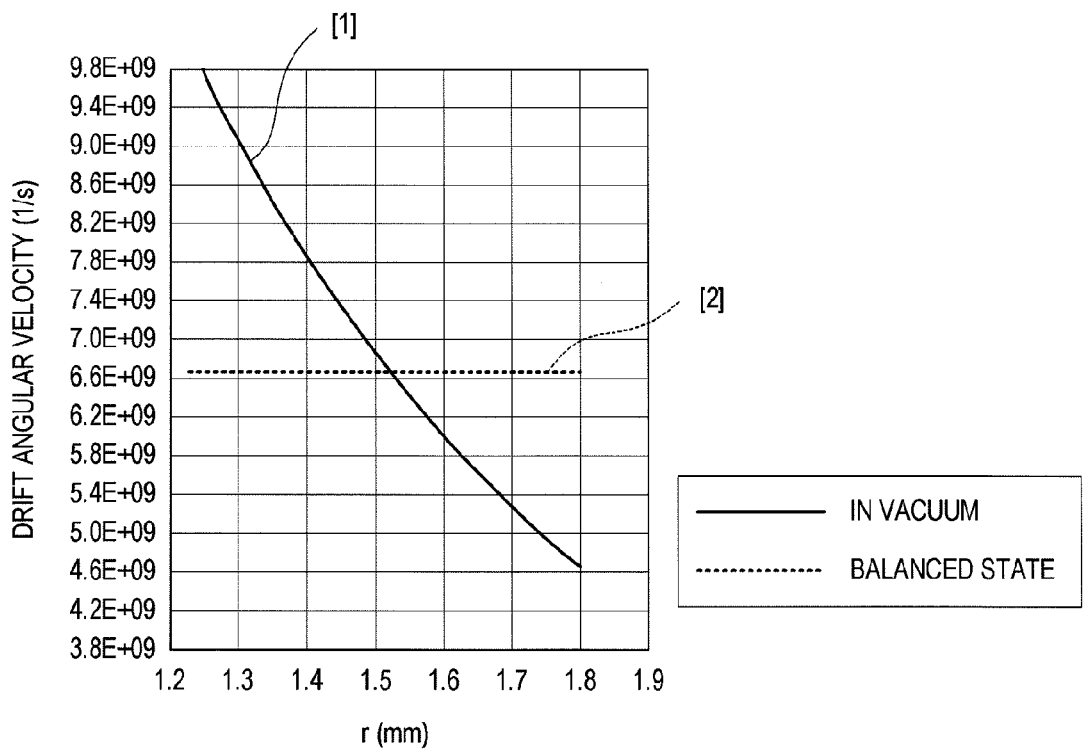
" and FIG. 5B is a graph showing a drift angular velocity in the acting space for the same cases.

FIG. 5A is a graph showing the electrical potential distributions in the acting space 3 in the case of being "in vacuum" and in the case of "balanced state," and FIG. 5B is a graph showing the drift angular velocity in the acting space 3 for the same cases. The cases are based on the magnetic flux density of 0.379 T (Tesla).

As shown in the horizontal axis of FIGS. 5A and 5B, the magnetron 101 of this embodiment is configured such that the circumferential surface of the cathode 2 is at a position of 1.2 mm from the axial center and the inner circumferential end face of the anode vanes 4 is at a position of 1.8 mm in radius. The acting space 3 has a range from approximately 1.2 mm to 1.8 mm.

In these graphs, [1] corresponds to "in vacuum," and [2] corresponds to "balanced state." Electrons rotate at a higher drift angular velocity near the cathode 2 corresponding to the electrical potential distribution of "in vacuum" as shown in FIG. 5B. As the electrons in the acting space 3 increases to shift to the electrical potential distribution of "balanced state," it is expected that the drift angular velocity will be lower and will be constant without depending on the distance r in the case of "balanced state."

Note that, based on FIGS. 5A and 5B, by the time from start of the electronic radiation and it reaches the balanced state, a state of the electrical potential distribution where the electric field intensity is constant (the electrical potential distribution is linear) may also occur as shown in FIG. 4B. This point will also be explained below.

[C] In the Case of Constant Electric Field Intensity

When the electric field intensity is constant, the electric field can be found as following.

$$E = \frac{V_a}{r_a - r_c} \quad (10)$$

The drift angular velocity $\omega_D$ at which the electron cloud rotates in the acting space 3 can be expressed as following.

$$\omega_D = \frac{E}{B} \cdot \frac{1}{r} = \frac{V_a}{B(r_a - r_c)} \cdot \frac{1}{r} \quad (11)$$

According to Equation 11, it can be seen that the drift angular velocity $\omega_D$ is in inverse proportion to the distance r. Therefore, the electrons rotate at a higher angular velocity as being closer to the cathode 2 in the acting space 3.

Figure 6A:
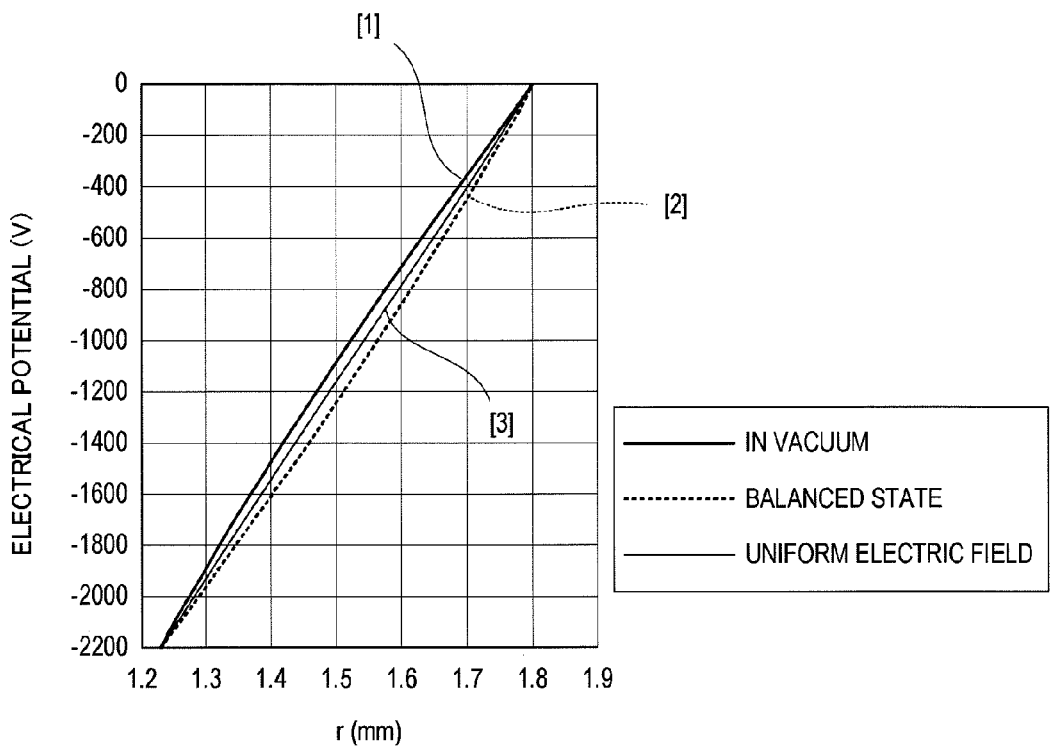
FIGS. 6A and 6B are corresponding graphs of FIGS. 5A and 5D to which a characteristic line [3] in the case of "constant electric field intensity" shown by Equation 10 and Equation 11 is added, respectively.
Figure 6B:
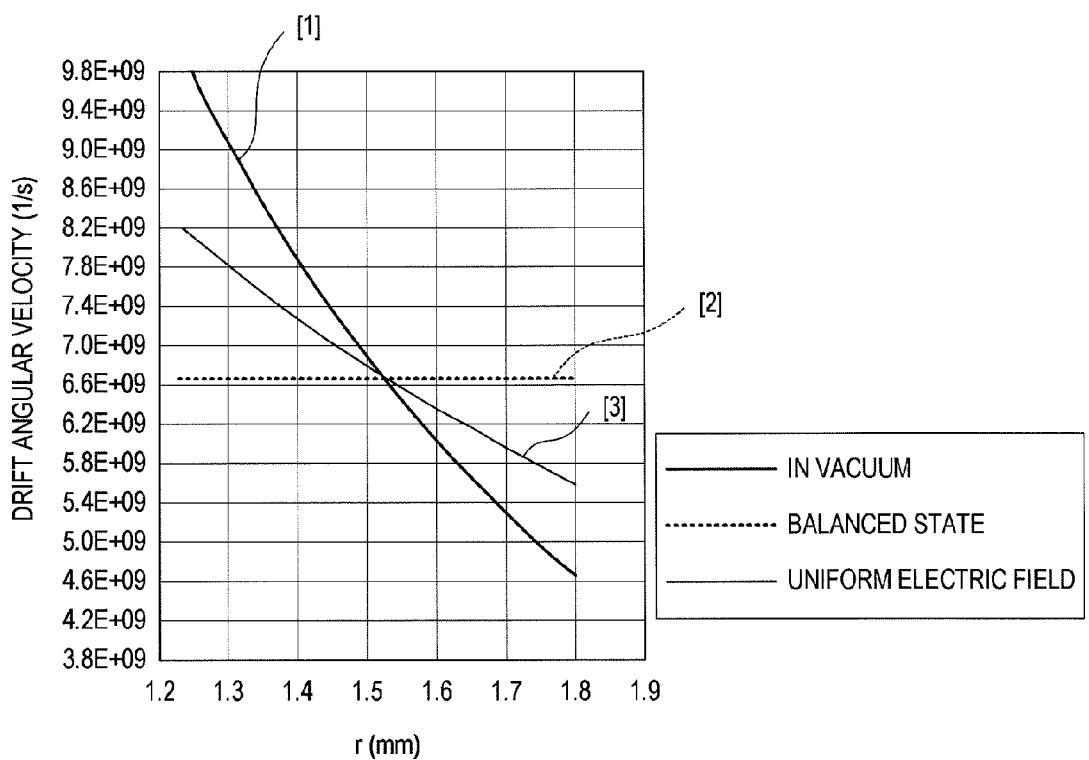

FIGS. 6A and 6B are graphs of FIGS. 5A and 5B to which the characteristic line [3] in the case of "constant electric field intensity" shown by Equations 10 and 11 is added, respectively. As described above, it can be understood that spurious emission at a high frequency occur near or around the cathode 2 at the rising edge (i.e., during the rising period from "in vacuum" to "constant electric field intensity").

[D] Correction of Drift Angular Velocity by Magnetic Field

The drift angular velocity is made to be constant by sloping the magnetic flux density. More specifically, from the speed of the E*B drift "in vacuum," the drift angular velocity can be expressed as following.

$$v_D = r\omega_D = \frac{2\pi f}{N} \cdot r = \frac{E}{B} = \frac{V_a}{ln\left(\frac{1}{\sigma}\right)} \cdot \frac{1}{rB} \quad (12)$$

Similarly, from the speed of the E*B drift "in the case that the electric field is uniform," the drift angular velocity can be expressed as following.

$$v_D = r\omega_D = \frac{2\pi f}{N} \cdot r = \frac{E}{B} = \frac{V_a}{B(r_a - r_c)} \quad (13)$$

Therefore, "in vacuum," if the magnetic field B (suppose that it is synonymous with the magnetic flux density) is made in inverse proportion to the square of the distance r, the drift angular velocity can be constant. That is, the magnetic flux density B is corrected from Equation 12 to be the following equation.

$$B = \frac{N}{2\pi f} \frac{V_a}{ln\left(\frac{1}{\sigma}\right)} \cdot \frac{1}{r^2} \quad (14)$$

In the case of "uniform electric field," if the magnetic field B (suppose that it is synonymous with the magnetic flux density) is made in inverse proportion to the distance r, the drift angular velocity can be constant. That is, the magnetic flux density B is corrected from Equation 13 so that it will be the following equation.

$$B = \frac{N}{2\pi f} \frac{V_a}{(r_a - r_c)} \cdot \frac{1}{r} \quad (15)$$

Figure 7A:
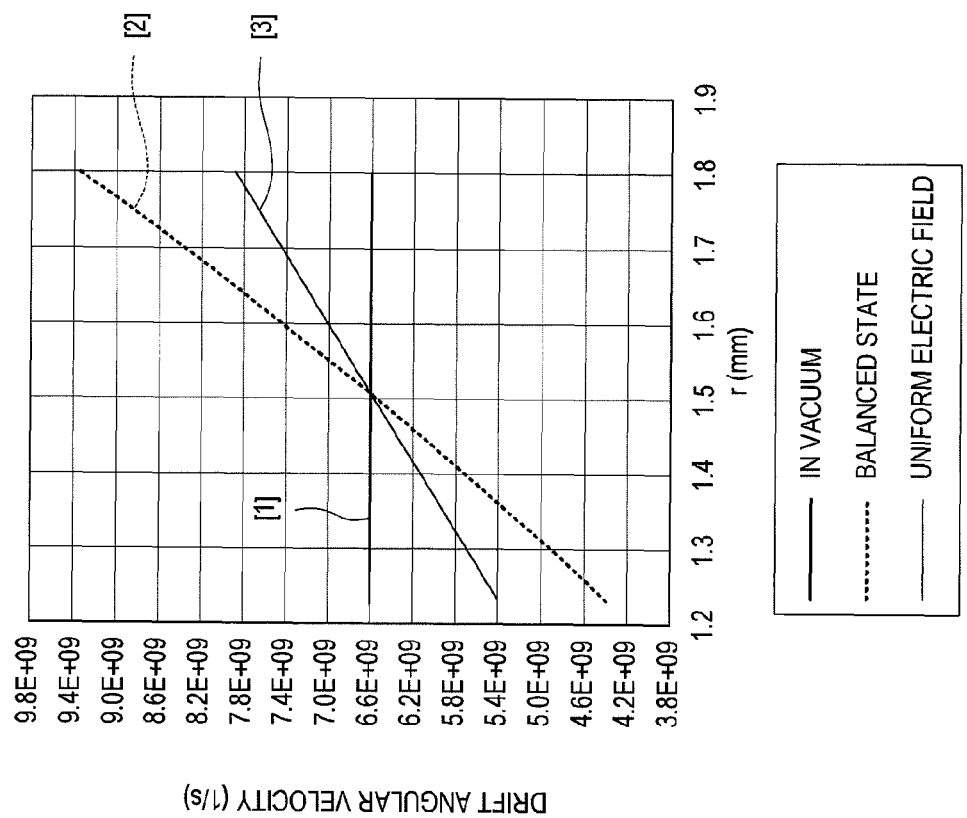
FIGS. 7A and 7B are graphs showing characteristics after the drift angular velocity is corrected, where
Figure 7B:
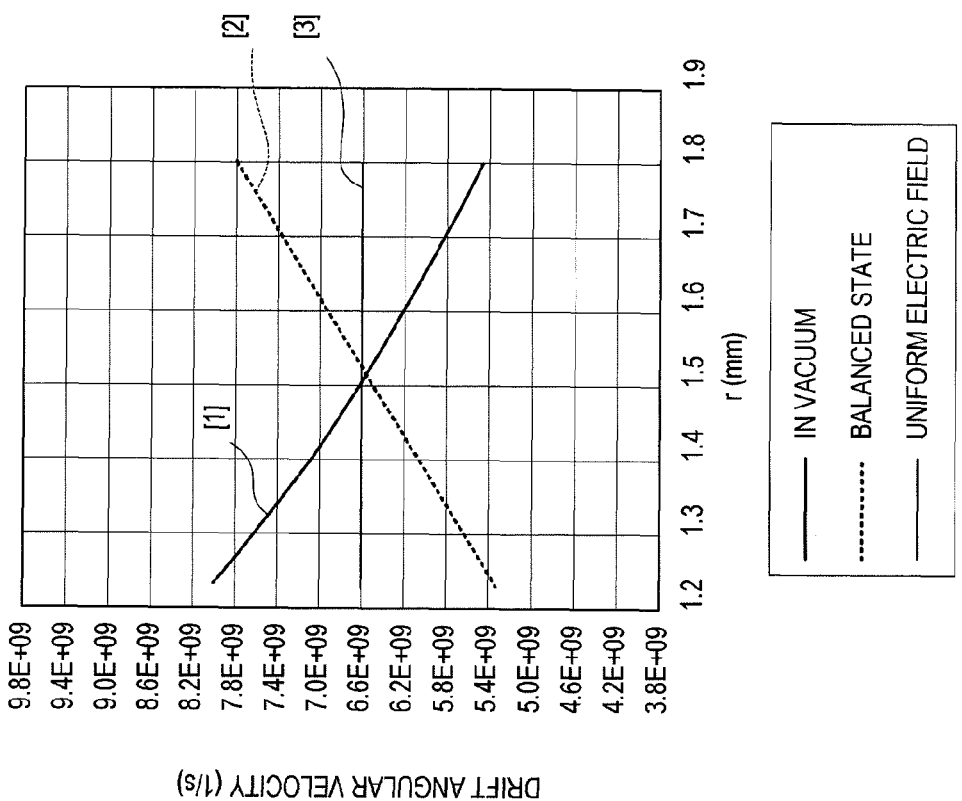

FIGS. 7A and 7B are graphs showing characteristics after the correction of the drift angular velocity. Particularly, FIG. 7A shows a corrected characteristic corresponding to Equation 15 in the case of "uniform electric field," and FIG. 7B shows a corrected characteristic corresponding to Equation 14 in the case of being "in vacuum." In order to make the drift angular velocity during the rising period constant, the distribution of the magnetic flux density near the cathode 2 in FIGS. 7A and 7B may be sloped.

According to the corrected characteristic line of FIGS. 7A and 7B, the electron cloud on the circumferential surface side of the cathode 2 will synchronize with a low frequency in the case of "balanced state." In this case, an electron cloud (space-charge spoke) on the side of the anode vanes 4 in the acting space 3 is considered to greatly participate in the oscillation phenomenon. Therefore, it may be more desirable to suppress generation of spurious emission at a low frequency. In addition, in order to stabilize the oscillation in $\pi$ mode, the magnetic flux density on the side of the anode vanes 4 may be made uniform in distribution.

As an example of the correction, a distribution having a slope is given to the magnetic flux density from the circumferential surface of the cathode 2 up to the intersecting point of the characteristic lines [1] and [3] shown in FIGS. 7A and 7B, respectively. In FIG. 7A and 7B, a distribution having a slope is given to the magnetic flux density up to approximately 1.5 mm, for example. In this case, a magnetic flux density distribution in inverse proportion to the square of the distance r is applied to a predetermined range that is from the circumferential surface of the cathode 2 to approximately 1.5-mm intermediate position (for example, a substantially half range of the acting space) that is at the intersecting point, and a magnetic flux density distribution in inverse proportion to the distance r is applied to the remaining range from the predetermined range to approximately the intersecting point. The remaining outside range of the acting space 3 from approximately the intersecting point will not be corrected, and will be a uniform magnetic flux density in the balanced state.

Figure 8A:
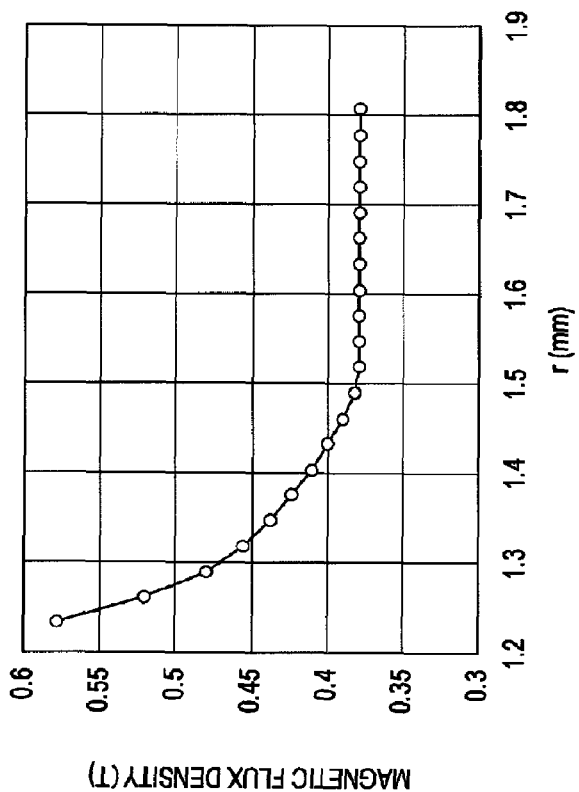
FIGS. 8A and 8B are graphs showing characteristics of the acting space after the correction, where
Figure 8B:
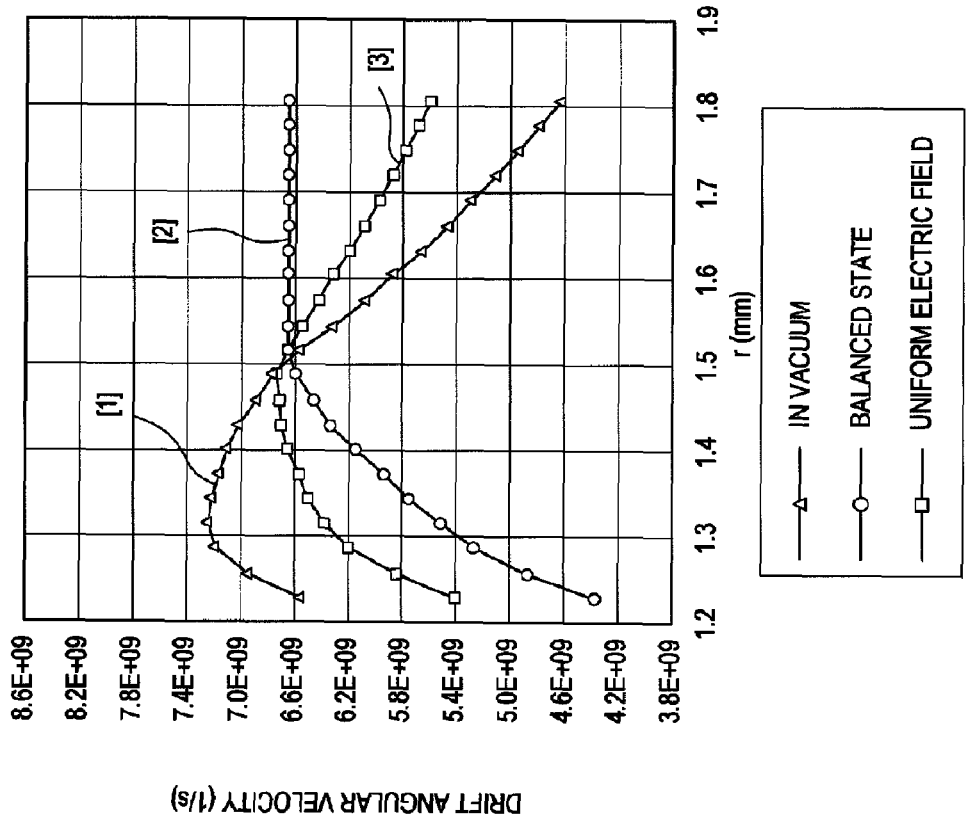

FIGS. 8A and 8B are graphs showing characteristics of the acting space after the correction, where FIG. 8A shows the magnetic flux density after the correction and FIG. 8B shows each characteristic of the draft angular velocity after the correction. In FIG. 8A, the magnetic flux density is in inverse proportion to the square of the distance r in a range from the circumferential surface of the cathode 2 (approximately 1.2 mm from the axial center) to 1.35 mm, and is in inverse proportion to the distance r in a range approximately from 1.35 mm to 1.5 mm. The magnetic flux density is constant from a range approximately from 1.5 mm to the inner circumferential end face of the anode vanes 4 (approximately 1.8 mm from the axial center).

According to FIG. 8B, a higher drift angular velocity plays a leading role than the drift angular velocity of the fundamental wave (approximately 6.6E+09) in the vicinity of the cathode 2 (i.e., approximately 1.2 mm to 1.35 mm) in an early stage of emission (at the rising edge of the pulse) (see the characteristic line [1]). During the subsequent pulse period, the case of uniform electric field and the case of balanced state (see the characteristic lines [3] and [2]) plays the leading role, and at this time, because the acting space will not be at least in the state of being in vacuum, it shifts to a low drift angular velocity. The drift angular velocity in the case of uniform electric field is stable approximately from 1.35 mm to 1.5 mm. On the other hand, this range from 1.35 mm to 1.5 mm also includes somewhat low drift angular velocity in the case of balanced state, and somewhat high drift angular velocity in the case of being in vacuum only at the rising edge. In the range from 1.5 mm to the inner circumferential end face of the anode vanes 4 (1.8 mm from the axial center), a low drift angular velocity in the case of being in vacuum and in the case of uniform electric field appears during the rising period. During the subsequent pulse period, a constant drift angular velocity equivalent to the drift angular velocity of the fundamental wave will continues for the case of balanced state. The low drift angular velocity during the rising period for the case of being in vacuum and the case of uniform electric field does not substantially related to the oscillation phenomenon because it occurs near the cathode 2 as described above.

As a result, the magnetron 101 is driven at a predetermined repetition frequency. Each time a microwave pulse is generated, spurious emission on the high-frequency side are suppressed accordingly during the rising period, and the spurious emission on the high-frequency side are also suppressed throughout the pulse period. Spurious emission due to a lower drift angular velocity than the drift angular velocity corresponding to the fundamental wave has a wavelength that is longer than that of the fundamental wave. For this reason, the spurious emission cannot pass through a waveguide for microwave transmission, and thereby it is not necessary to adopt a special member or material to intercept the spurious emission effectively.

Hereinafter, more particular embodiments of the present invention are explained.

First Embodiment

Figure 9:
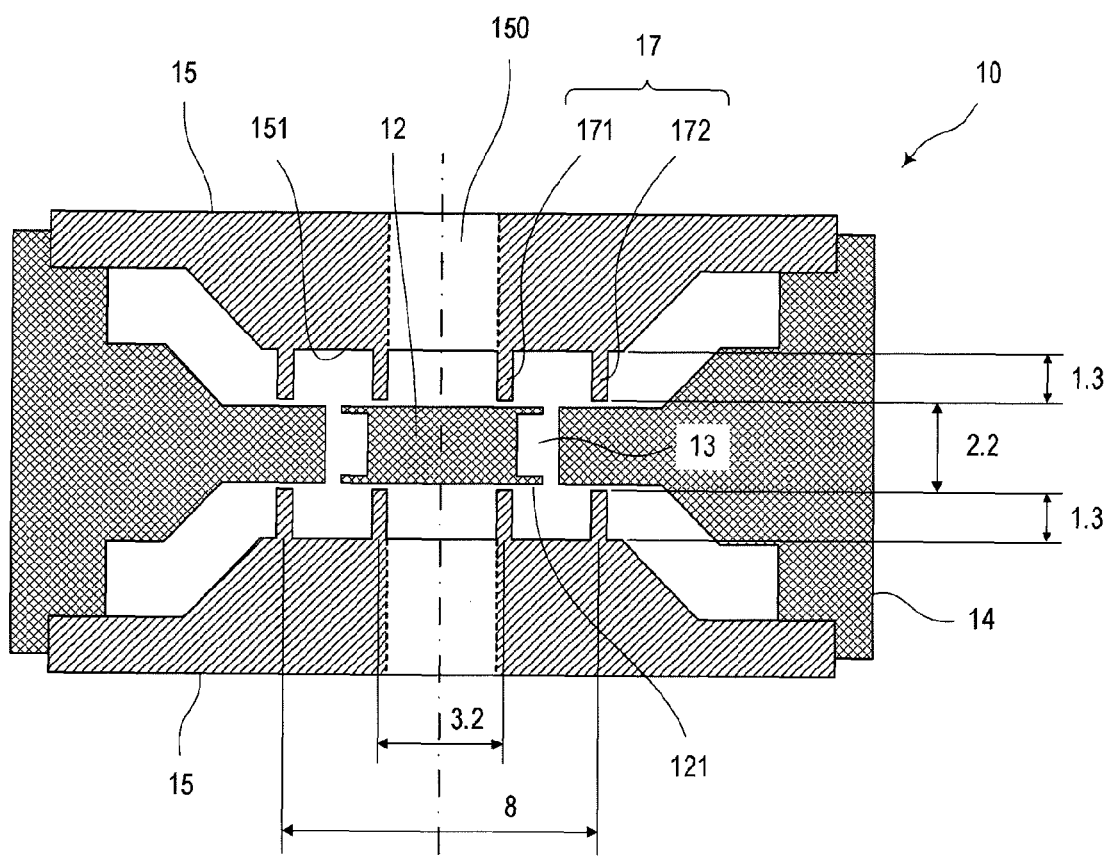
FIG. 9 is a longitudinal cross-sectional view showing a magnetron according to a first embodiment of the present invention.
Figure 10:
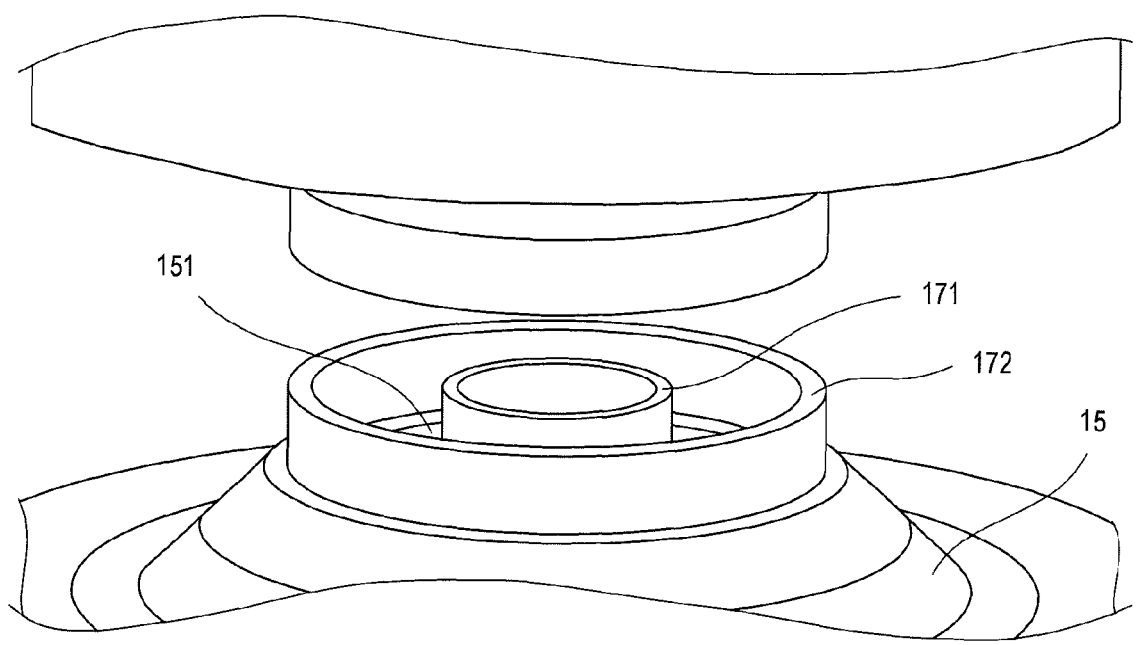
FIG. 10 is a perspective view showing a structure of a pole piece.
Figure 11:
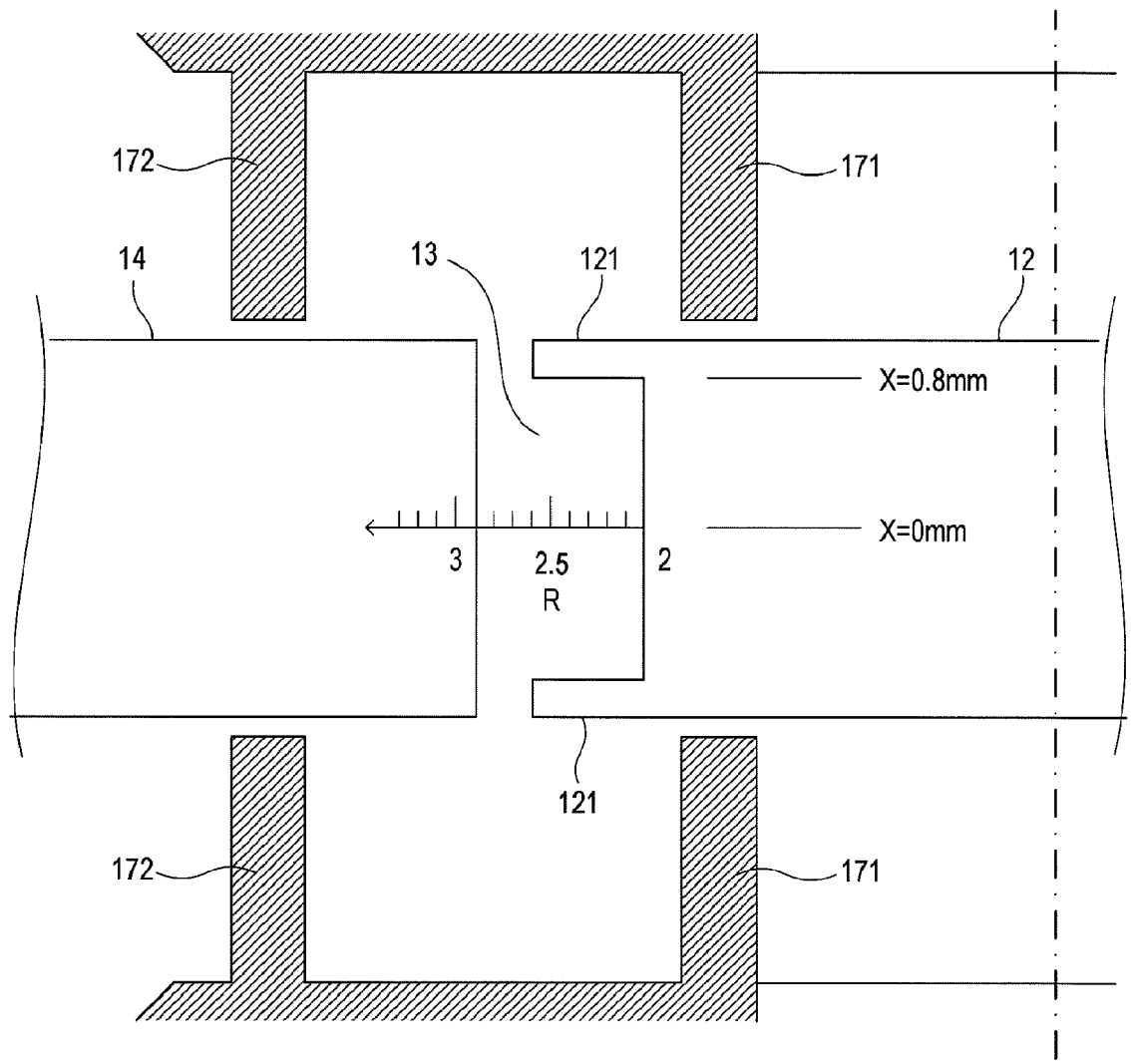
FIG. 11 is a longitudinal cross-sectional view showing a spatial relationship between the acting space and the pole piece.
Figure 12:
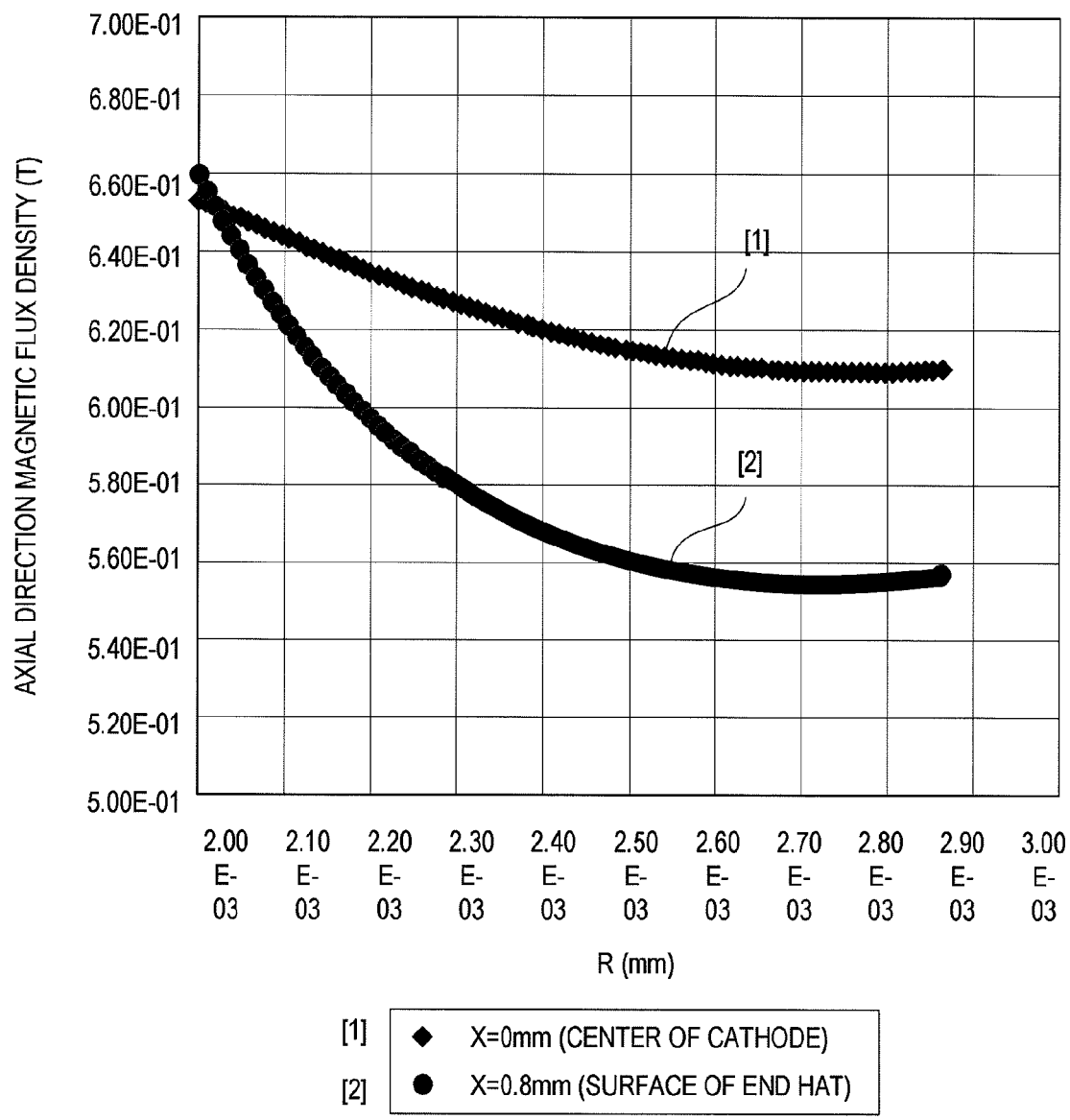
FIG. 12 shows distributions of the magnetic flux density in the acting space of FIGS. 10 and 11.

FIG. 9 is a longitudinal cross-sectional view showing a magnetron 10 according to a first embodiment of the present invention, FIG. 10 is a perspective view showing a structure of a pole piece of this embodiment, FIG. 11 is a longitudinal cross-sectional view showing a spatial relationship between the acting space and the pole piece, and FIG. 12 shows distributions of the magnetic flux density in the acting space shown in FIGS. 10 and 11.

The magnetron 10 of this embodiment includes a cathode 12 of a cylindrical shape having a predetermined radius (for example, approximately 3.2 mm) arranged coaxially at the center of an axis of an anode cylinder (not illustrated) having a cylindrical shape. Protective end hats 121 of a flange shape are provided to the both ends of the cathode 12 in the axial direction, respectively. A plurality of radiating anode vanes 14 are arranged so as to be spaced from each other on the inner circumferential wall of the anode cylinder (not illustrated). An annular acting space 13 is formed between the inner circumferential end face of the anode vanes 14 and the outer circumferential surface of the cathode 12. A gap between the anode vanes 14 adjacent to each other functions as a resonant cavity.

At the time of operation of the magnetron 10, a voltage is applied so that the anode vanes 14 have a predetermined electrical potential Va to form a predetermined electric field E in the acting space 13 between the cathode 12 and the anode vanes 14.

A pair of the pole pieces 15 made of a magnetic material are arranged on the both sides of the acting space 13 in the axial direction so as to intervene the acting space 13 therebetween. The opposing faces of the pole pieces 15 are flat planes perpendicular to the axial direction and parallel to each other. Magnets (not illustrated) are arranged on the outside of the pole pieces 15 in the axial direction, respectively. The magnetic fluxes generated by the magnets (not illustrated) form a magnetic field in the axial direction in the acting space 13 between the cathode 12 and the anode vanes 14 via both of the pole pieces 15.

Each of the pole pieces 15 has a support hole 150 at the center, which extends parallel to the axial direction, and the opposing faces 151 are planes perpendicular to the axial direction as described above. Cylindrical bodies 171 and 172 made of a magnetic material are attached to the opposing faces 151 so as to locate around the axial center coaxially. The cylindrical bodies 171 and 172 serve as a magnetic flux density changing member 17 and have a predetermined diameter. The cylindrical bodies 171 and 172 form an inner ridge and an outer ridge on the opposing faces 151. The cylindrical bodies 171 and 172 may be integrated with the pole piece 15 such that they protrude as sleeves of the pole piece 15, or may be provided separately from the pole piece 15. The material of the cylindrical bodies 171 and 172 may be the same as that of the pole piece 15, or may be different from the pole piece 15 in magnetic permeability.

In this embodiment, the inner cylindrical body 171 has a radius corresponding to the radius of the cathode 12, and the outer cylindrical body 172 has a radius corresponding to a proper location in the cavity outside the inner circumferential end face of the anode vanes 14. The cylindrical bodies 171 and 172 may be of similar shapes except for their radii, or may have heights and thicknesses which are set independently.

The inner cylindrical body 171 forms a low magnetic resistance area in the vicinity of the cathode 12, and constitutes a magnetic path for collecting magnetic fluxes to this area. The outer cylindrical body 172 corrects the magnetic flux density distribution to lift up the distribution, which typically decreases in a range from the acting space 13 to inside the cavity due to the inner cylindrical body 171. The lift-up effect makes the magnetic flux density approximately constant at least from the middle of the acting space 13 (for example, near the mid-point of the acting space 13) toward the outside of an outermost position of the acting space 13 (inner circumferential end face of the anode vanes 14). The magnetic field correction by the cylindrical bodies 171 and 172 mainly depends on parameters, such as a height, a thickness, a radius (and interval), and a magnetic permeability. In this embodiment, the cylindrical body 171 has a radius of 1.6 mm and a height of 1.2 mm to 1.3 mm (a size with which the cylindrical body 171 does not contact the cathode 12), and the cylindrical body 172 has a radius of 4.0 mm and a height of 1.2 mm to 1.3 mm (a size with which the cylindrical body 172 does not contact the anode vanes 14). A thickness is approximately several one tenth of millimeter for the both cylindrical bodies.

In FIG. 11, a dimension of the cathode 12 in the axial direction is 1.6 mm (each end hat 121 is 0.3 mm). With reference to the scale shown in FIG. 11, a radius of the cathode 12 is 2.0 mm, and a radius of the inner circumferential end face of the anode vanes 14 is 2.9 mm. Therefore, the acting space 13 extends in a range of R=2.0 mm to 2.9 mm (here, R (mm) is a distance from the axial center of the cathode 2). Note that the dimensions in the axial direction are expressed in a distance in the axial direction with X (mm) with respect to the center of the cathode 12 in the axial direction.

FIG. 12 shows distributions of the magnetic flux density [T: Tesla] in a R-X coordinate system with the configuration of FIG. 10. In this graph, [1] indicates a characteristic line of the magnetic flux density distribution at X=0 mm, and [2] indicates a characteristic line of the magnetic flux density distribution at X=0.8 mm.

According to the characteristic line [1], it gradually decreases with a loose curve (downwardly convex) from the circumferential surface of the cathode 12 (R=2.0 mm), and becomes approximately constant (stable) at approximately R=2.5 mm to 2.9 mm. On the other hand, according to the characteristic line [2], it decreases with a curve (downwardly convex) of a relatively steep slope from the circumferential surface of the cathode 12 (R=2.0 mm) to approximately R=2.3 mm, then gradually decreases substantially linearly approximately from R=2.3 mm to R=2.6 mm, and then becomes approximately constant (stable) the outside the range.

Preferably, the above configuration may be designed such that the distribution of magnetic flux density is in inverse proportion to the square of the distance r in a first range near the cathode, is in inverse proportion to the distance r in a second range outside the first range, and is constant in a third range outside the second range, as shown in FIG. 8A. For the range near the cathode, the distribution may also be in inverse proportion to the square of the distance r or in inverse proportion to the distance r. This design also suppresses the spurious emission on the high-frequency side, as apparent from the characteristic lines [1] and [2] and the characteristic lines [2] and [3] of FIG. 8B.

In actual cases, it may be difficult to achieve the exact distributions described above, which indicate somewhat ideal distributions. However, the approximated distributions also exert similar or the same effects.

Hereinafter, modified embodiments are explained referring to FIGS. 13 to 15.

Second Embodiment

Figure 13:
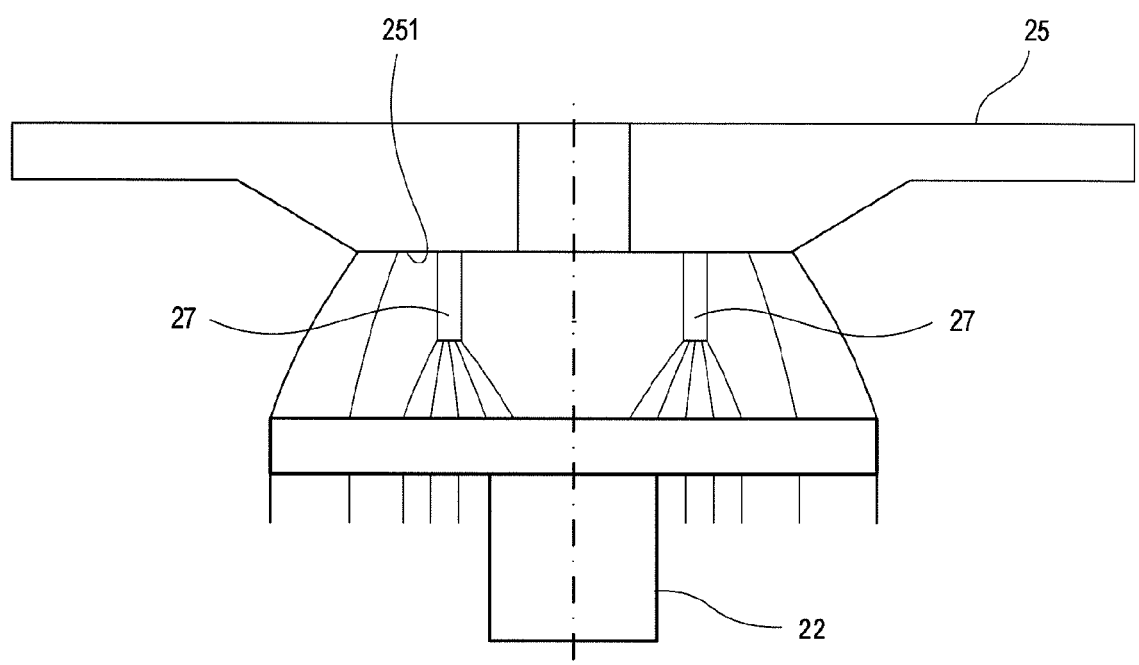
FIG. 13 is a longitudinal cross-sectional view showing a magnetron according to a second embodiment of the present invention.

FIG. 13 is a longitudinal cross-sectional view showing a magnetron according to a second embodiment of the present invention. In FIG. 13, a single cylindrical body 27 made of a magnetic material is provided near a position on the opposing face 251 of the pole piece 25, corresponding to the radius of the cathode 22, so as to be integral with or separately from the opposing face 251. This cylindrical body 27 forms a low magnetic resistance area in the vicinity of the cathode 22, and constitutes a magnetic path for collecting magnetic fluxes to this area. Therefore, a distribution of the magnetic flux density in which it decreases from the circumferential surface of the cathode 22 toward the acting space can be realized. The magnetism and shape of the cylindrical body 27 are appropriately adjusted to narrow the concentrated range of the magnetic fluxes. By doing this adjustment, a variation in the magnetic flux density due to the cylindrical body 27 will not be appeared as much as possible in a range substantially from the mid-point of the acting space 23 toward the outside. Therefore, it may be possible to treat the magnetic flux density in a range from substantially the mid-point toward the outside of the acting space 23 as approximately constant.

Third Embodiment

Figure 14:
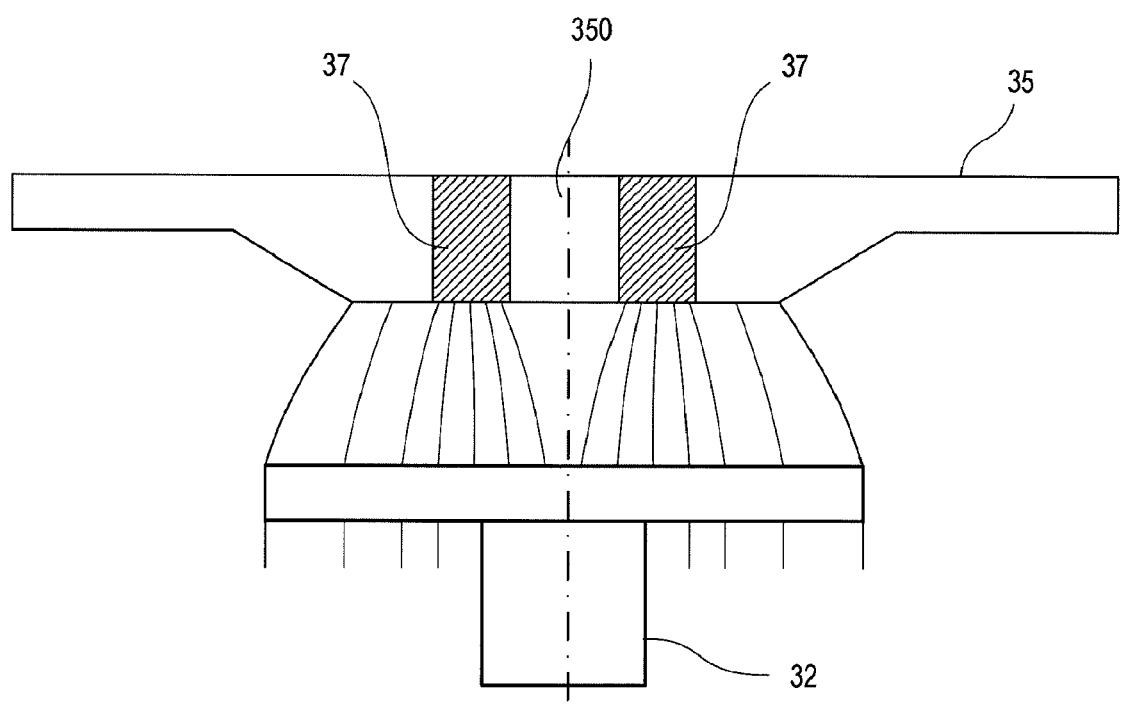
FIG. 14 is a longitudinal cross-sectional view showing a magnetron according to a third embodiment of the present invention.

FIG. 14 is a longitudinal cross-sectional view showing a magnetron according to a third embodiment of the present invention. An annular cylindrical body 37 having a higher magnetic permeability than the pole piece 35 is fitted into the pole piece 35 so as to replace a part of the pole piece 35. By having the radius of the cylindrical body 37 correspond to the circumferential surface position of the cathode 32, the distribution of the magnetic flux density is reduced from the circumferential surface of the cathode 32 toward the acting space. The cylindrical body 37 is press-fitted into a support hole 350 at the axial center of the pole piece 35 where the support hole 350 is formed somewhat greater than that of the previous embodiments and the center hole of the cylindrical body 37 serves as the support hole 350 in this embodiment. The cylindrical body 37 may be fixed to the pole piece by any other fixing methods including use of adhesives. The pole piece 35 may be eliminated to form a single solid cylindrical body. In such case, the pole piece 35 may be divided into two rings that are discontinuous in radius, and the cylindrical body 37 may be fitted therebetween by press-fit or adhesion, etc. The cylindrical body 37 does not have to have the same thickness as that of the pole piece 35 and, thus, an annular groove of a necessary depth may be formed on the opposing face 251 of the pole piece 35 and the cylindrical body 37 may then be fitted into the groove.

Fourth Embodiment

Figure 15A:
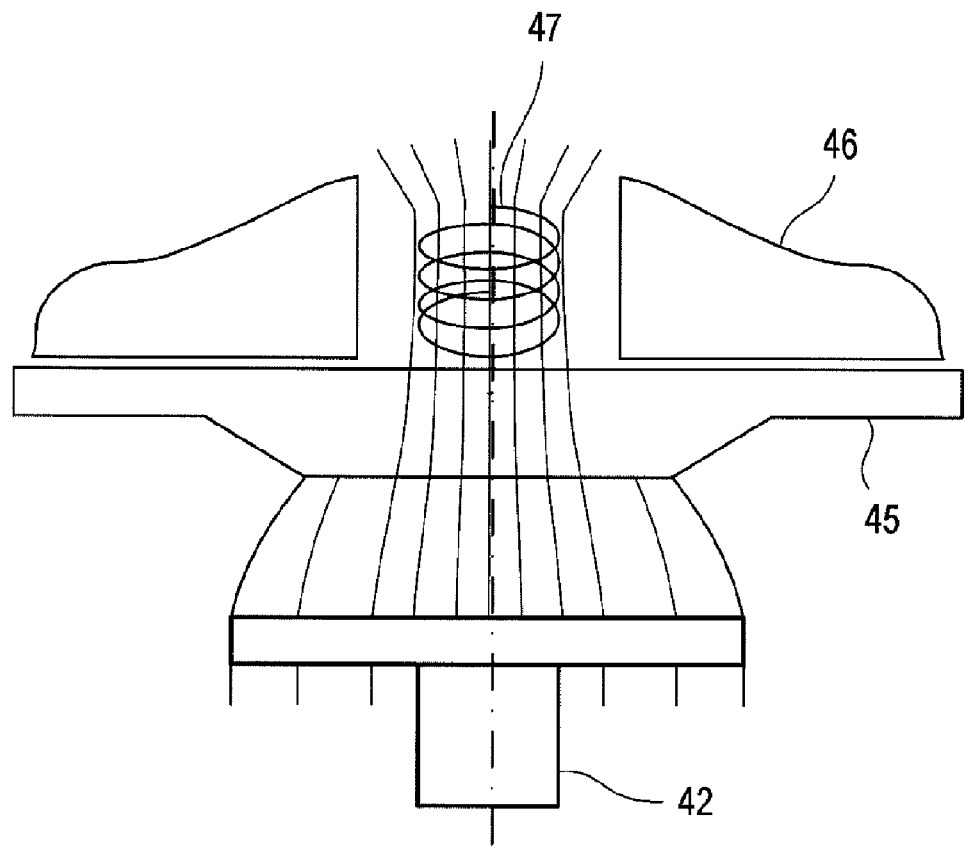
FIG. 15 is a longitudinal cross-sectional view showing a magnetron according to a fourth embodiment of the present invention.
Figure 15B:
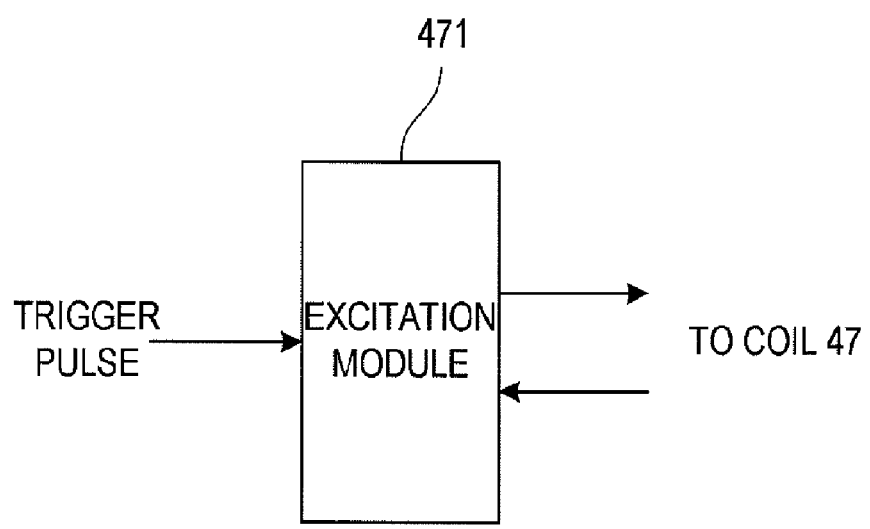

FIGS. 15A and 15B show a fourth embodiment of the present invention. As shown in FIG. 15A which shows a longitudinal cross-sectional view of a magnetron of this embodiment, a hole or gap is formed at the center of a magnet 46 arranged outside a pole piece 45 and an electromagnetic coil 47 is installed in this gap. The electromagnetic coil 47 is oriented such that magnetic fluxes being excited are parallel to the axial direction. A necessary level of electric current may be constantly supplied to the electromagnetic coil 47 to give a high magnetic flux density near the circumferential surface of the cathode 42.

As shown in FIG. 15B, an excitation module 471 of the electromagnetic coil 47 receives a trigger pulse from the pulse drive circuit 102 (see FIG. 1). The predetermined excitation current may be supplied only at the rising edge thereof (i.e., only at the rising edge up to the case of being "in vacuum" described in the previous embodiments, or only during the rising period further including the case of "uniform electric field"). Thus, a high magnetic flux density area may be formed dynamically. By doing this, spurious emission on the high-frequency side can be suppressed during the rising period, and after that, it will be only in the case of "balanced state," thereby providing original uniform magnetic flux density throughout the acting space.

Fifth Embodiment

A predetermined area of the end hat on the outer circumferential side may be made of a magnetic material to realize concentration of magnetic fluxes in the vicinity of the cathode surface and to obtain a high magnetic flux density distribution. In this case, various annular (ring) shapes other than the cylindrical shape may also be adopted in place of the shapes of the cylindrical bodies 171 and 172 as the magnetic flux density correction (changing) members.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims, including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "approximately" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

What is claimed is:

1. A magnetron, comprising:
    a cylindrical cathode having a center axis;
    an anode coaxially arranged with the cathode so as to be separated from the cathode via a predetermined space; and
    a pair of pole pieces provided to both ends of the cathode in the axial direction so as to oppose to each other and having opposing faces perpendicular to the axial direction, each of the pole pieces having a first ridge of a ring shape that is formed on the opposing face and is coaxial with the cathode.

2. The magnetron according to claim 1, wherein a diameter of the first ridge is approximately equal to a diameter of the cathode.

3. The magnetron according to claim 2, wherein the anode is provided with a plurality of anode vanes having a shape protruding from the inner wall of the anode toward the cathode.

4. The magnetron according to claim 3, wherein each of the pole pieces further includes a second ridge of a ring shape formed on the corresponding opposing face so as to coaxial with the cathode and having a diameter larger than the diameter of the first ridge.

5. The magnetron according to claim 4, wherein the diameter of the second ridge is larger than an inner diameter formed by inner ends of the anode vanes and smaller than the diameter of the inner circumferential end face.

6. The magnetron according to claim 5, wherein the first ridge and the second ridge are made of a magnetic material.

7. The magnetron according to claim 1, wherein a magnetic flux density of the space in the radial direction, that is perpendicular to the axis, decreases substantially continuously from the axis toward the outside up to a predetermined range.

8. The magnetron according to claim 7, wherein the magnetic flux density is distributed uniformly in a range outside the predetermined range in the radial direction.

9. The magnetron according to claim 8, wherein the magnetic flux density of the space in the radial direction, that is perpendicular to the axis, decreases substantially in inverse proportion to the square of a distance from the axis up to a predetermined inner range located inside the predetermined range toward the outside from the axis, and decreases in substantially inverse proportion to the distance from the axis up to the predetermined range from the predetermined inner range toward the outside from the axis.

10. A magnetron, comprising:
    a cylindrical cathode having a center axis;
    an anode coaxially arranged with the cathode so as to be separated from the cathode via a predetermined space; and
    a pair of pole pieces provided to both ends of the cathode in the axial direction so as to oppose to each other and having opposing faces perpendicular to the axial direction, each of the pole pieces including a cylindrical body having a magnetic permeability higher than a magnetic permeability of the pole pieces, and formed in each of the pole pieces coaxially with the cathode.

11. The magnetron according to claim 10, wherein a magnetic flux density of the space in the radial direction, that is perpendicular to the axis, decreases substantially continuously from the axis toward the outside up to a predetermined range.

12. The magnetron according to claim 11, wherein the magnetic flux density is distributed uniformly in a range outside the predetermined range in the radial direction.

13. A magnetron, comprising:
    a cylindrical cathode having a center axis;
    an anode coaxially arranged with the cathode so as to be separated from the cathode via a predetermined space;

a pair of pole pieces provided to both ends of the cathode in the axial direction so as to oppose to each other and having opposing faces perpendicular to the axial direction; and a magnetic flux density control module for decreasing a magnetic flux density of the space in the radial direction, that is perpendicular to the axis, substantially continuously from the axis toward the outside up to a predetermined range.

14. The magnetron according to claim 13, wherein the magnetic flux density control module is a magnetic excitation module arranged outside the both ends of the cathode in the axial direction, for generating a magnetic field where magnetic fluxes are parallel to the axial direction.

15. The magnetron according to claim 14, wherein the magnetic excitation module includes:

a magnet having a cylindrical space having an axis that is substantially in agreement with the axis; and an electromagnetic coil arranged in the cylindrical space.

16. The magnetron according to claim 15, wherein the magnetic flux density of the space in the radial direction, that is perpendicular to the axis, decreases substantially continuously from the axis toward the outside up to a predetermined range.

17. The magnetron according to claim 16, wherein the magnetic flux density is distributed uniformly in a range outside the predetermined range in the radial direction.

18. A radar apparatus, comprising:

a magnetron, comprising:

a cylindrical cathode having a center axis;

an anode coaxially arranged with the cathode so as to be separated from the cathode via a predetermined space; and a pair of pole pieces provided to both ends of the cathode in the axial direction so as to oppose to each other and having opposing faces perpendicular to the axial direction, each of the pole pieces having a first ridge of a ring shape that is formed on the opposing face and is coaxial with the cathode; and a reception module for receiving an electromagnetic wave that is discharged from the magnetron and reflected on a target object.

* * * * *